(12) United States Patent
Sarkis

(10) Patent No.: US 11,784,470 B2
(45) Date of Patent: Oct. 10, 2023

(54) ENHANCED ENERGY REDUCING MAINTENANCE SWITCH (EERMS) TO REDUCE ELECTRIC ARC FLASH ENERGY

(71) Applicant: SAUDI ARABIAN OIL COMPANY, Dhahran (SA)

(72) Inventor: Jose Sarkis, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 140 days.

(21) Appl. No.: 17/490,842

(22) Filed: Sep. 30, 2021

(65) Prior Publication Data
US 2023/0097925 A1    Mar. 30, 2023

(51) Int. Cl.
*H02B 11/133* (2006.01)
*H02H 7/22* (2006.01)
*H02B 1/38* (2006.01)

(52) U.S. Cl.
CPC ............. *H02B 11/133* (2013.01); *H02B 1/38* (2013.01); *H02H 7/22* (2013.01)

(58) Field of Classification Search
CPC .. H01H 9/00; H01H 9/20; H01H 9/22; H01H 9/28; H01H 9/285; H01H 2300/00; H01H 2300/056; H01H 2300/06; H01H 2300/062; H01H 2300/064; H01H 2300/066; H01H 7/22; H02B 13/00; H02B 13/02; H02B 13/025; H02B 13/0356; H02B 13/0358; H02B 13/045; H02B 13/065; H02B 11/00; H02B 11/04; H02B 11/20; H02B 11/133; H02B 1/38; E05B 47/00; E05B 47/0603; E05B 47/0001; E05B 47/0015; E05B 47/0048; E05B 47/005; E05B 47/0063; H02H 7/22
USPC ....................................................... 200/50.21
See application file for complete search history.

(56) References Cited

U.S. PATENT DOCUMENTS 6,192,718 B1 * 2/2001 Bollinger, Jr. ......... H01H 9/285
70/2

* cited by examiner

*Primary Examiner* — Anthony R Jimenez
(74) *Attorney, Agent, or Firm* — Osha Bergman Watanabe & Burton LLP

(57) ABSTRACT

An Enhanced Energy Reducing Maintenance Setting (EERMS) device is disclosed. The EERMS device includes an EERMS switch having a normal/OFF mode and a maintenance/ON mode, a IED protection relay operatively connected to the EERMS switch and configured to activate maintenance mode by receiving an IED input when the EERMS switch is switched to maintenance/ON mode, a key-solenoid lock device configured to trap a key of an EERMS panel, wherein the key-solenoid lock cylinder is energized to release the trapped key by closing of IED output NO dry auxiliary contacts, and a circuit breaker panel door comprising a circuit breaker lock cylinder mechanism interlocked with the EERMS switch. The circuit breaker lock cylinder mechanism receives and subsequently re-traps the key released by the key-solenoid lock cylinder from the EERMS panel. The circuit breaker lock cylinder mechanism is interlocked with the EERMS switch by being operatively connected to the key-solenoid lock device.

15 Claims, 4 Drawing Sheets

ENHANCED ENERGY REDUCING MAINTENANCE SWITCH (EERMS) TO REDUCE ELECTRIC ARC FLASH ENERGY

BACKGROUND

Energy Reducing Maintenance Setting (ERMS) switches are widely used to protect people and electrical equipment from damage caused by arc flash events. In arc flash events, a large amount of energy is released between two live conductors, causing powerful blast and massive pressure waves. The ERMS is a 2-position switch that has two settings of "Normal" and "Maintenance." During maintenance activities, and when the target range for the arc flash event cannot be achieved by the normal IED protection relay settings, the operator can switch the ERMS to the "maintenance" mode, which provides an input signal to the associated IED protection relay, lowering of instantaneous pickup to a preprogrammed value and speeding up the circuit breaker tripping time resulting in a reduction of the arc-flash incident energy hazard to below 8 cal/cm$^2$ when activated. Once the maintenance work is completed, the switch can be returned to normal settings that provide the optimal protection and coordination.

If the operator is not aware of the existence of the ERMS switch, or if the operator mistakenly identifies another ERMS switch in the switchgear line up, the operator may open up the door panel of the breaker to be serviced, exposing himself to dangerous levels of arc flash incident energy. Accordingly, there exists a need for enhanced personnel protection against fatal electric arc flash incidents that may develop during operations and maintenance of electric equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to An Enhanced Energy Reducing Maintenance Setting (EERMS) device, comprising an enhanced energy reducing maintenance switch (EERMS) switch being configured to be in a normal/OFF mode and a maintenance/ON mode, a Intelligent Electrical Device (IED) protection relay operatively connected to the EERMS switch and configured to activate maintenance mode by receiving an IED input when the EERMS switch is switched to maintenance/ON mode, the IED protection relay comprising normally open (NO) dry auxiliary contacts configured to close in response to the EERMS switch being switched to maintenance/ON mode, a key-solenoid lock device configured to trap a key of an EERMS panel, wherein the key-solenoid lock cylinder is configured to be energized to release the trapped key by closing of the IED output NO dry auxiliary contacts, and a circuit breaker panel door comprising a circuit breaker lock cylinder mechanism interlocked with the EERMS switch, the circuit breaker lock cylinder mechanism configured to receive and subsequently re-trap the key released by the key-solenoid lock cylinder from the EERMS panel, wherein the circuit breaker lock cylinder mechanism is interlocked with the EERMS switch by being operatively connected to the key-solenoid lock device.

In general, in one aspect, the invention relates to a method for operating an Enhanced Energy Reducing Maintenance Setting (EERMS) device, comprising switching an EERMS switch to maintenance/ON mode using an EERMS panel comprising a two-position selector, activating an intelligent electrical device (IED) relay to maintenance mode relay settings, closing of auxiliary dry type normally open (NO) contacts of an IED output, thereby energizing a key-solenoid lock device to release a key trapped in the key-solenoid lock device, inserting released key into a circuit breaker door cylinder lock to open a corresponding circuit breaker panel door, wherein the circuit breaker door cylinder lock is interlocked with the circuitry of the EERMS device, performing maintenance operations with the circuit breaker panel door open with the key trapped in the circuit breaker door cylinder lock by the key-solenoid lock device, and upon completion of maintenance operations, closing the circuit breaker panel door to release the trapped key from the interlocked circuit breaker door cylinder lock.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

An ERMS is a switch mechanism that either breaks or completes a circuit in order to protect an operator from arc flashes of energy when working on maintenance of a circuit breaker. The ERMS is a lockable switch that may be an integral part of an operator's Lock Out/Tag Out (LOTO)

procedure. Once the maintenance work has been performed, the switch can be returned to normal settings that provide the optimal protection and coordination. One or more embodiments disclosed herein provide an Enhanced ERMS (EERMS) switch device and lock mechanism.

In general, embodiments disclosed herein relate to an Enhanced Energy Reducing Maintenance switch (EERMS) that ensures the safety of personnel by interlocking the operation of the circuit breakers and preventing opening of the circuit breaker door panel and hence preventing maintenance activities if the associated EERMS switch is not put in the "ON" or "Maintenance" position. This EERMS interlock protects personnel from forgetting or neglecting activating the maintenance switch prior to the operation and maintenance activities. In addition, once the EERMS is put on maintenance position, the added interlock will protect against inadvertent switching back the maintenance switch to off position. The protection against arc flash incidents will not be removed unless the maintenance activities are completed, the circuit breaker panel door is closed, and a key is put back from the circuit breaker panel door to its original position in the EERMS device panel.

Figure 1:
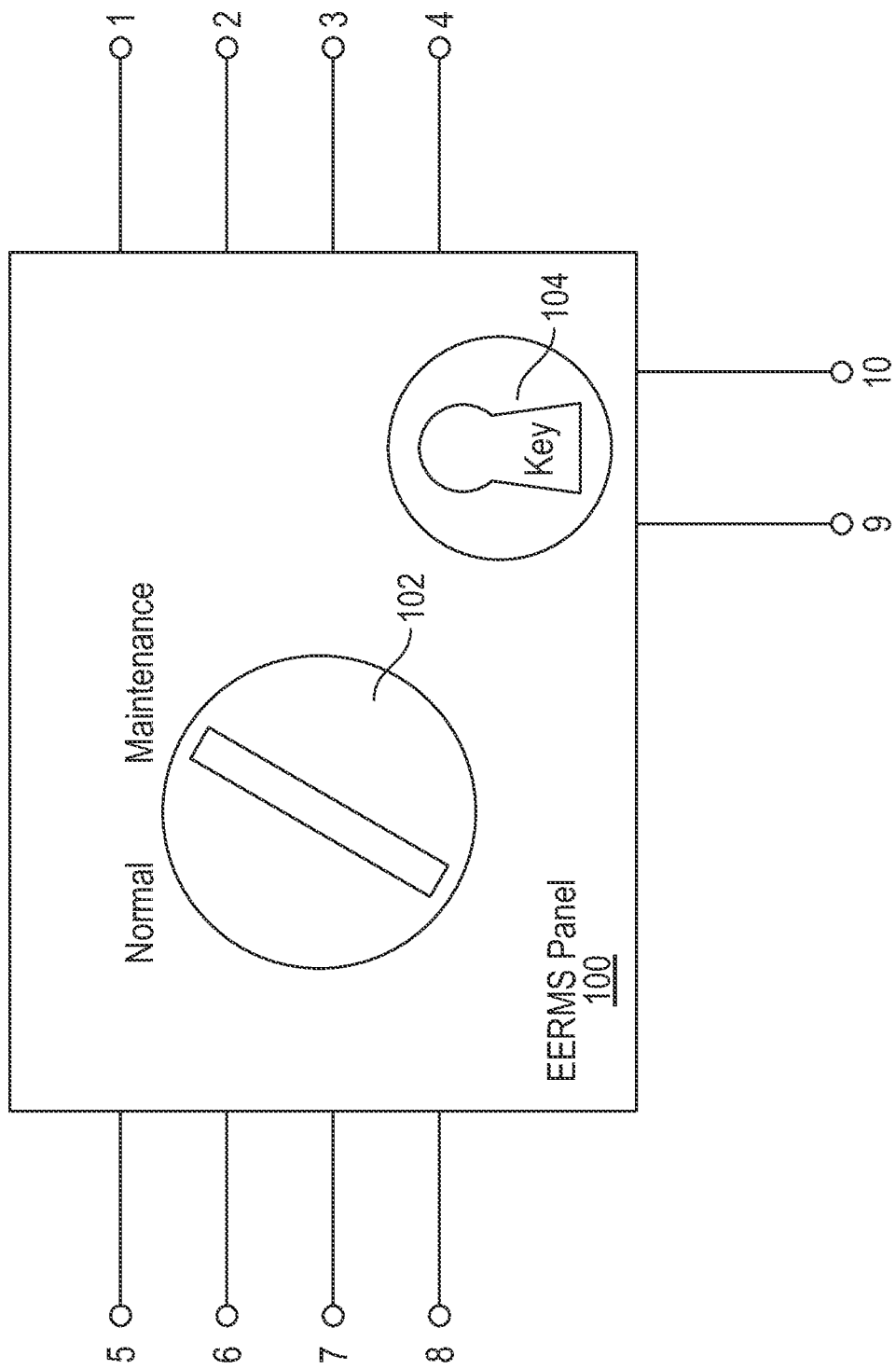
FIG. 1 shows an Enhanced Energy Reducing Maintenance Setting (EERMS) device panel in accordance with one or more embodiments.

FIG. 1 shows an EERMS device panel (100) in accordance with one or more embodiments. The EERMS device panel (100) is the physical interface that an user/operator interacts with, to place the ERMS switch into "normal" or "maintenance" mode. The EERMS device panel (100) includes a two-position selector switch (102) that toggles the EERMS device between the "normal" and "maintenance" modes. The two-position selector switch (102) may be located on the door (e.g., trim cover) on a breaker. When a user/operator needs to service downstream equipment, the ERMS switch is switched to "maintenance" mode using the two-position selector switch (102) to reduce the current and/or time required to trip a breaker. The ERMS function is used to reduce the instantaneous protection setting of the breaker which allows for the reduction of the fault clearing time so that the circuit breaker can trip quicker. If a fault occurs, this ability for the breaker to trip quicker thus reduces the Arc Flash Incident Energy (AFIE) level the user/operator is potentially exposed to, thereby protecting the user/operator. Specifically, the AFIE level is reduced to 8 cal/cm2 or less.

The EERMS device panel (100) includes contacts (labelled 1-9) which are operatively connected to other components of the EERMS circuit, as described in FIG. 2 below. As shown, contacts 1-9 may be auxiliary dry type contacts, with contacts 1-4 dedicated to the maintenance mode functions of the EERMS switch, contacts 5-8 dedicated to the normal operation mode of the EERMS switch, and contacts 9-10 dedicated to a key-solenoid device (104). The contacts of the EERMS device are further described in the circuit diagram of FIG. 2 below.

In one or more embodiments, the key-solenoid device (104) is a locking device inside of which a key is trapped, i.e., the key-solenoid locking device does not release the key until certain conditions are met. In one or more embodiments, the EERMS device (102) and the key-solenoid lock device (104) work in conjunction or in combination to ensure that the key is only released (and thereby maintenance operations can only be performed) once the EERMS device (102) is placed in maintenance mode, thereby energizing the key-solenoid locking device. More detailed functionality of the key-solenoid locking device (104) is further described in FIG. 3 below. In one or more embodiments, the EERMS switch (102) and the key-solenoid device (104) are housed in a single unit.

Those skilled in the art will appreciate that the EERMS device panel (100) may further include components not shown, e.g., a local status indicator in the form a light indicating which mode is currently selected, etc., without departing from the scope disclosed herein.

Figure 2:
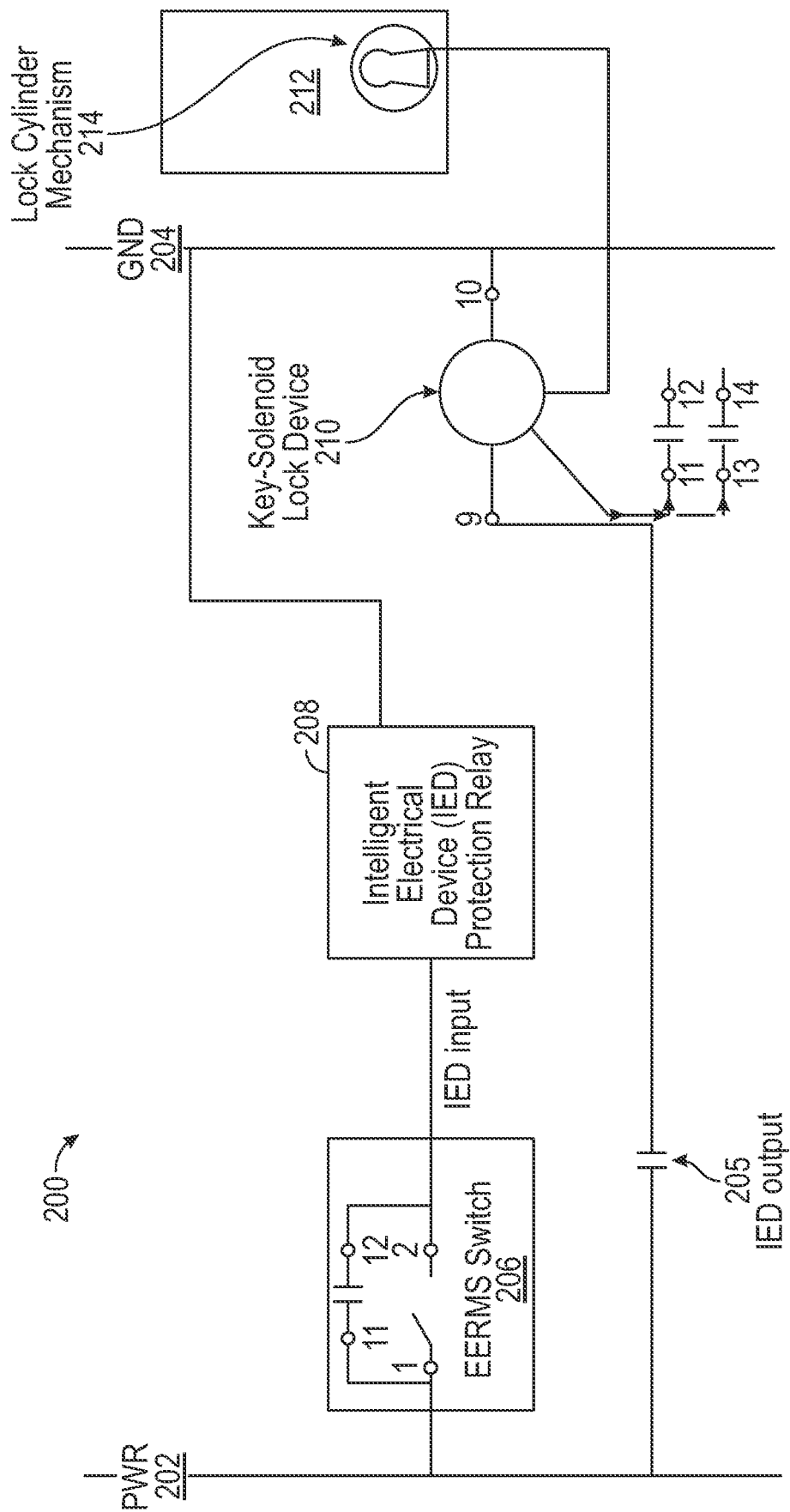
FIG. 2 shows a circuit diagram in accordance with one or more embodiments.

FIG. 2 shows a circuit diagram (200) for the EERMS device when it is operating in maintenance mode in accordance with one or more embodiments. Specifically, the circuit diagram (200) includes a power supply (PWR) (202), which may be a controlled voltage, ground (GND) (204), an EERMS switch (206), an Intelligent Electrical Device (IED) Protection Relay (208), a key-solenoid locking device (210) and a circuit breaker door panel (212) with a cylinder lock mechanism (214). Each of the aforementioned components is described in detail below.

In the circuit (200) of FIG. 2, PWR (202) may be provided by any suitable power source, such as a battery, that provides a voltage source. In one or more embodiments, the PWR (202) may be any control voltage available in the switchgear, typically 125 VDC or 120 VAC. On the other hand, the circuit is connected to ground (GND) ground or earth, which is the reference point in an electrical circuit from which voltages are measured. The ERMS switch (206) is connected to the PWR (202) and includes a single switch as shown.

Terminal contacts 1-2 of the EERMS switch (206) is operatively connected to the IED relay input. Further, the EERMS includes normally open (NO) auxiliary dry type contacts (labelled 11-12 in FIG. 2) which close when the EERMS is switched to the "ON-Maintenance position. A dry contact (also known as a volt free contact or potential-free contact) is defined as a contact in which power/voltage is not directly provided from the switch but is instead always being supplied by another source. Dry contacts are known as passive contacts, as no energy is applied to the contacts. Dry contacts simply operate like an ordinary switch that opens or closes the circuit. When the contacts are closed the current flows through the contacts and when the contacts are opened no current flows through the contacts.

In one or more embodiments, when the EERMS (100) is placed in maintenance mode using the EERMS panel (100) of FIG. 1, the EERMS switch (206) in the circuit closes, and the NO contacts (1-2) also close, thereby completing the circuit of FIG. 2 to the IED input, i.e., providing input to the IED protection relay that is operatively connected to the EERMS switch (206). This activates the IED protection relay (208), thereby activating the maintenance mode relay settings. The IED (208) protection relay is an integrated microprocessor-based controller of power system equipment, such as circuit breaker (212). The IED output (205) is also a dry type contact as shown in FIG. 2. In other words, the IED output (205) is a secondary set of contacts of the IED protection relay (208) circuit which does not make or break the primary current being controlled by the relay. The IED output (205) is normally open (NO), and also closes to confirm that the IED protection relay (208) is activated in maintenance mode. These NO contacts closing completes the circuit to the key-solenoid lock device at terminal contacts 9-10, providing current to the solenoid circuit, and energizing the solenoid coil (shown below in FIG. 3). As shown in FIG. 2, the IED protection relay normally open output (IED output) contact is connected in series with both the EERMS normally open contact (terminal contact 1-2 of the EERMS switch (206)) and the key-solenoid locking device (210).

Continuing with FIG. 2, once the solenoid is energized, solenoid lock device (210) is configured to release the key (104) trapped in the EERMS panel (100). This same key is then used to open the circuit breaker door panel (212). The circuit breaker door panel (212) may be in the same switchgear line-up with the EERMS panel (100) (e.g., 2-4 meters away) or may be in another switchgear, for example 4-8 meters away. Particularly, the circuit breaker door panel (212) includes a circuit breaker cylinder lock mechanism (214) configured to receive the same, identical key released from the EERMS panel (100). The circuit breaker cylinder lock mechanism (214) may be any suitable manually key operated cylinder lock. The circuit breaker door panel may be adjacent to the EERMS device panel (100).

The mechanically operated auxiliary contacts 11-12 and 13-14 are normally open (NO) contacts of the key-solenoid device (210). More specifically, NO contacts 11-12, 13-14 are mechanically operated by rotational movement, and belong to the key-solenoid lock device 210. These contacts (11-12, 13-14) change to normally close (NC) contacts when the key is turned/removed from the key-solenoid device (210). As shown in FIG. 2, the circuit breaker lock mechanism (214) is interlocked with the key-solenoid lock device (210). Due to this interlocking, when the key released from the EERMS panel (100) is received by the circuit breaker lock mechanism (214), the EERMS switch (206) is sealed in using the key solenoid mechanical auxiliary contacts 11-12. That is, while maintenance activity is ongoing, even if the ERMS two-position selector switch is turned to OFF/Normal mode by mistake/accident, the circuit (200) remains completed via the interlocked circuit breaker cylinder lock mechanism (214). This provide reverse protection and ensures that operator error does not turn off the arc flash protection that is provided during maintenance mode. As long as the circuit breaker panel door (212) remains open, the key will not be released by the circuit breaker cylinder lock mechanism (214), and the interlocking protection exists.

Those skilled in the art will appreciate that the circuit diagram (200) of FIG. 2 is one possible implementation of interlocking the single unit EERMS and key-solenoid locking devices with the circuit breaker panel door cylinder locking mechanism (112), and that other implementations are possible without departing from the scope disclosed herein.

Figure 3:
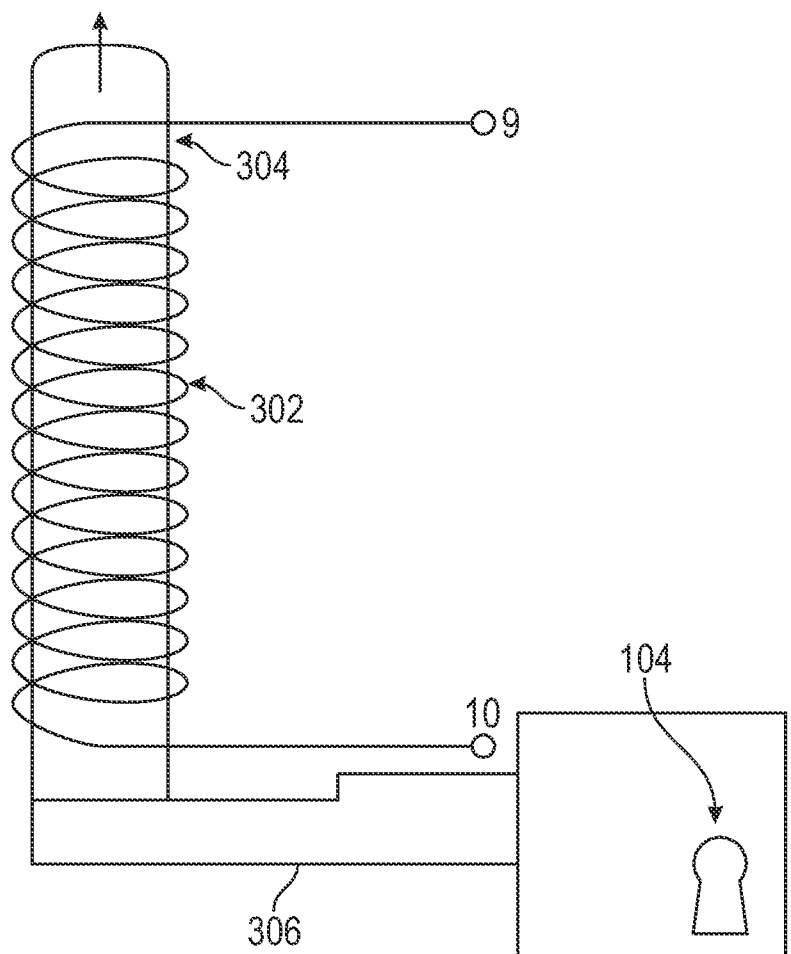
FIG. 3 shows an expanded view of the key-solenoid lock device of FIG. 2 in accordance with one or more embodiments.

FIG. 3 shows an expanded view of the key-solenoid device (210) of the EERMS circuit (200) of FIG. 2 in accordance with one or more embodiments. Specifically, FIG. 3 shows the operation of the key-solenoid device (210) in releasing the key from the EERMS panel (100) of FIG. 1. In one or more embodiments, the key-solenoid device (210) is made up of a solenoid coil (302) with a metal rod (304) passing through it. The metal rod (304) acts as a stop against the mechanical key mechanism (306), preventing the key mechanism (306) from moving, thereby trapping the key in the key-solenoid locking device.

When the solenoid coil receives power by switching of the EERMS switch from normal to maintenance mode, thereby closing the EERMS switch in the circuit diagram of FIG. 2 and activating the IED protection relay to maintenance mode, a current circulates through the coil (302), energizing the solenoid and moving the metal rod (304) so that it no longer acts as a stop preventing the mechanical key mechanism (306) into which the key is initial inserted from moving when the key is turned or shifted in some way. For example, in FIG. 3, the mechanical rod may move upward, as indicated by the arrow in FIG. 3. The key-solenoid locking device (210) then releases the key for the user/operator to insert the key into the circuit breaker lock cylinder mechanism (214).

The solenoid lock device (210) also has additional mechanical auxiliary normally open (NO) contacts as shown in FIG. 2, which are the same NO contacts of the EERMS switch (206), which are not reproduced in FIG. 3.

Those skilled in the art will appreciate that the key and the mechanical key mechanism employed in the EERMS panel (100) and the circuit breaker panel door may be the same mechanical key/lock structure or a different structure, as long as the same, identical key can be inserted and trapped into both physical interfaces. Further, the mechanical key mechanism may be any suitable lock/key structure that is known in the art. For example, the mechanical key structure may use a laser-cut key, a tubular key, a flat key without any cutting, a dimple key, a skeleton key, a primary key or any other type of key with corresponding locking mechanisms. It is also envisioned that the key/lock mechanism may be a keycard with corresponding key slot, a magnetic key or a smart key.

Figure 4:
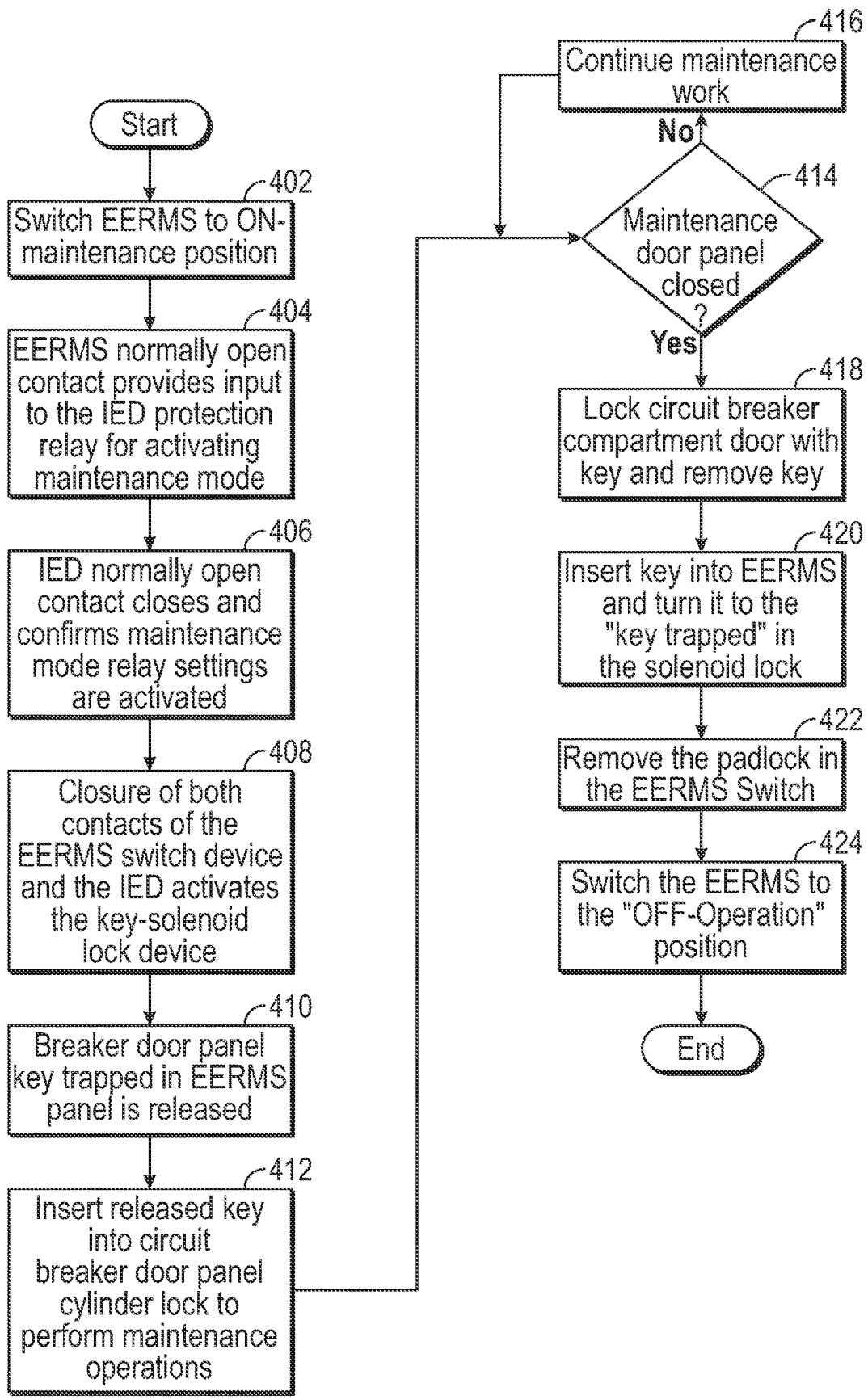
FIG. 4 shows a flowchart in accordance with one or more embodiments.

FIG. 4 shows a flowchart for a method of operation of the EERMS switch device in accordance with one or more embodiments disclosed herein. The settings and configurations for performing the steps of the method may be similar to those of the EERMS system described with reference to FIGS. 2-3. One or more blocks in FIG. 4 may be performed using the EERMS panel 100 as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Before the method of FIG. 4 begins, in one or more embodiments, the initial system status of the EERMS device is that the main circuit breaker and feeder breakers are energized, circuit breaker panel doors are locked closed and the EERMS is disengaged in the "OFF" position (i.e., the two-position selector switch (102) is in the normal position). At this stage, the key is trapped in the lock. When the maintenance operator wishes to perform any maintenance of the system, the EERMS is switched to the "ON-Maintenance" position (Step 402). This may be done by turning a knob or elongated member on the EERMS panel, as shown in FIG. 1, thereby switching the function of the EERMS from operational mode to a maintenance mode.

When the EERMS switch (206) is activated, the switch closes (contacts 1-2) provides input to the IED protection relay (208) for activating maintenance mode (Step 404). Next, the IED (208) normally open contact closes and confirms maintenance mode relay settings are activated (Step 406). Directly as a result of Steps 404 and 406, the closer of both the contacts of the ERMS switch and the IED protection relay provides power and energizes the key-solenoid lock device (Step 408). In Step 410, the trapped key is released by the activation of the key-solenoid lock device, as described in FIG. 3.

The released key is then inserted into the circuit breaker cylinder lock (214), to open the circuit breaker door panel (212) where maintenance work need to be performed by the user/operator (Step 412). That is, a single key is used to both lock the EERMS panel when the EERMS is in OFF mode (normal operation) and to open the circuit breaker door panel when the EERMS is in the ON-maintenance mode. Maintenance operations may now commence, while the key is again trapped in the lock cylinder (214) by the same key-solenoid lock device while the compartment door (212) is kept open. In one or more embodiments, the circuit breaker cylinder lock is interlocked with the EERMS device panel, as shown in the circuit (200) of FIG. 2. That is, NO contacts 11-12, 13-14 mechanically operated by rotational movement belong to the key-solenoid lock device 210, and change from NO to NC when the key is extracted/released from the solenoid, thereby sealing-in the EERMS switch in the maintenance position. Because of this interlocking between the two locking mechanisms (one in the circuit breaker panel door and the other in the EERMS panel), when the released key is inserted into the circuit breaker cylinder lock (214), even if someone accidentally turns the two-position selector of the EERMS device panel back to OFF (Normal) mode, the protection against arc flash incidents will not be removed unless the maintenance activities are completed, door is closed, key is put back to its original switch and the solenoid is deenergized.

At this stage, a determination is made as to whether the circuit break panel door is closed (Step 414). If the door is open, maintenance work continues and the key remains trapped (Step 416). Once maintenance work is complete (Step 414), the circuit breaker compartment/panel door is locked with the key and the key is removed (Step 418). The same key is then inserted back into the EERMS device panel (100) and turned, so that the key is again trapped by the key-solenoid locking device (210) (Step 420). This removes the padlock in the EERMS switch (Step 422). The EERMS two-position selector may now be turned to the OFF or Normal operation position (Step 424).

Those skilled in the art will appreciate that the process of FIG. 4 may be repeated each time maintenance is performed in the circuit breaker panel, for protection against AFIE of the maintenance worker/operator.

Embodiments of the present disclosure may provide at least one of the following advantages. There is a large quantity of ERMSs currently installed at the switchgears and control gears. During maintenance activities, the utilization of the ERMSs are not practiced, which expose maintenance personnel to dangerous (life threating) level of arc flash incident energy. The new ERMS, called Enhanced Energy Reducing Maintenance Switch (EERMS) ensures the safety of personnel by blocking the opening of the circuit breaker compartment door and inherently enforces the use of the corresponding ERMS. The EERMS is a single electrical device that works in conjunction or in combination with a key-solenoid lock device (all housed in one unit) interlocked with the circuit breaker compartment door lock cylinder mechanism.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. An Enhanced Energy Reducing Maintenance Setting (EERMS) device, comprising:
   an enhanced energy reducing maintenance setting (EE-RMS) switch being configured to be in a normal/OFF mode and a maintenance/ON mode;
   an Intelligent Electrical Device (IED) protection relay operatively connected to the EERMS switch and configured to activate a maintenance mode by receiving an IED input when the EERMS switch is switched to a maintenance/ON mode, the IED protection relay comprising normally open (NO) dry auxiliary contacts configured to close in response to the EERMS switch being switched to the maintenance/ON mode;
   a key-solenoid lock device configured to trap a key of an EERMS panel, wherein the key-solenoid lock cylinder is configured to be energized to release a trapped key by closing the NO dry auxiliary contacts; and
   a circuit breaker panel door comprising a circuit breaker lock cylinder mechanism interlocked with the EERMS switch, the circuit breaker lock cylinder mechanism configured to receive and subsequently re-trap the key released by the key-solenoid lock cylinder from the EERMS panel,
   wherein the circuit breaker lock cylinder mechanism is interlocked with the EERMS switch by being operatively connected to the key-solenoid lock device.

2. The EERMS device of claim 1, wherein the EERMS switch and the key-solenoid lock device are housed in a single unit.

3. The EERMS device of claim 1, wherein the EERMS switch is a single switch with two dry type contacts.

4. The EERMS device of claim 1, wherein the EERMS panel comprises a two-position selector to toggle the EERMS switch from the normal/OFF mode to the maintenance/ON mode.

5. The EERMS device of claim 1, wherein insertion of the released key into the circuit breaker lock cylinder mechanism permits the circuit breaker panel door to be opened for performing maintenance operations.

6. The EERMS device of claim 5, wherein the key-solenoid lock device comprises a plurality of auxiliary dry type NO contacts that are configured to close while the key is re-trapped in the circuit breaker lock cylinder mechanism.

7. The EERMS device of claim 6, wherein the plurality of auxiliary dry type NO contacts are mechanically operated by rotational movement.

8. The EERMS device of claim 6, wherein the plurality of auxiliary dry type NO contacts that belong to the key-solenoid lock device comprise four auxiliary dry type NO contacts.

9. A method for operating an Enhanced Energy Reducing Maintenance Setting (EERMS) device having circuitry, comprising:
   switching an EERMS switch to a maintenance/ON mode using an EERMS panel comprising a two-position selector;
   activating an intelligent electrical device (IED) relay to maintenance mode relay settings;
   closing auxiliary dry type normally open (NO) contacts of an TED output, thereby energizing a key-solenoid lock device to release a key trapped in the key-solenoid lock device;
   inserting the released key into a circuit breaker door cylinder lock to open a corresponding circuit breaker panel door, wherein the circuit breaker door cylinder lock is interlocked with the circuitry of the EERMS device;

performing maintenance operations with the circuit breaker panel door open with the key trapped in the circuit breaker door cylinder lock by the key-solenoid lock device; and upon completion of the maintenance operations, closing the circuit breaker panel door to release the trapped key from the interlocked circuit breaker door cylinder lock.

10. The method of claim 9, wherein the two-position selector toggles the EERMS switch from a normal/OFF mode to the maintenance/ON mode.

11. The method of claim 9, wherein interlocking of the circuit breaker door cylinder lock with the circuitry of the EERMS device protects against inadvertently switching back the maintenance switch to an OFF/Normal mode.

12. The method of claim 9, further comprising: inserting the key into the key-solenoid lock device via the EERMS panel to open the circuitry of the EERMS device and removing protection against arc flash incidents.

13. The method of claim 9, further comprising: switching the EERMS switch to an OFF/Normal position upon completion of the maintenance operations and closing the circuit breaker panel door.

14. The method of claim 9, wherein the EERMS switch and the key-solenoid lock device are housed in a single unit.

15. The method of claim 9, further comprising: locking the circuit breaker panel door with the trapped key before the key is released.

\* \* \* \* \*